United States Patent
Mahoney

[11] 3,950,023
[45] Apr. 13, 1976

[54] SIDE WALL CONSTRUCTION FOR A CARGO TRANSPORTING AND HANDLING VEHICLE

[76] Inventor: James D. Mahoney, 4 Ivy Lane, Oak Brook, Ill. 60521

[22] Filed: Feb. 22, 1974

[21] Appl. No.: 445,284

Related U.S. Application Data

[60] Division of Ser. No. 302,477, Oct. 30, 1972, Pat. No. 3,833,139, which is a continuation-in-part of Ser. No. 132,319, April 8, 1971, abandoned.

[52] U.S. Cl.............. 296/28 M; 105/367; 105/409; 214/83
[51] Int. Cl.².......................................... B62D 25/02
[58] Field of Search............ 296/3, 4, 28 M, 40, 13; 211/49 D, 49 R; 105/423, 367, 373, 473, 474, 497, 409; 214/83, 83.36

[56] References Cited
UNITED STATES PATENTS

| | | | |
|---|---|---|---|
| 1,233,154 | 7/1917 | Wilson | 296/13 |
| 1,932,225 | 10/1933 | Minter | 214/83 X |
| 1,933,800 | 11/1933 | Hannaman | 296/13 |
| 2,318,794 | 5/1943 | Parker, Jr. | 296/3 |
| 2,422,768 | 6/1947 | Benn | 296/4 |
| 2,710,105 | 6/1955 | Schwartz | 214/83.36 X |
| 2,976,824 | 3/1961 | Johnston | 105/497 X |
| 3,224,385 | 12/1965 | Elsner | 105/474 |
| 3,252,730 | 5/1966 | Cheiger et al. | 296/40 X |
| 3,608,955 | 9/1971 | Tantlinger | 296/28 M |
| 3,711,148 | 1/1973 | Hindin | 105/423 X |

Primary Examiner—Robert J. Spar
Assistant Examiner—Donald W. Underwood
Attorney, Agent, or Firm—Hibben, Noyes & Bicknell

[57] ABSTRACT

A cargo transporting and handling vehicle is disclosed, which facilitates unloading of cargo elements from and loading of cargo elements onto the vehicle at the various stops along a route. The vehicle has a body having a plurality of elongated guide members mounted on the floor thereof so as to provide a plurality of longitudinally extending paths for guiding the direction of movement of cargo elements on the floor. When the cargo elements are standard sized, 55 gallon drums, four, closely adjacent paths are provided. A lift gate at the rear of the body serves to facilitate the loading of filled drums onto the rear ends of the paths, and doors are provided on the sides of the body, adjacent the front end thereof, through which empty drums on the paths are unloaded. A gate is provided at the front end of each pair of paths to control the movement of drums on the paths and onto an unloading station adjacent each side door.

Movement of the drums along the paths as the vehicle proceeds along its route is achieved by slanting the paths downwardly from the rear end toward the front end of the vehicle body. A diverting abutment at the front end of the inner pair of paths serves to channel drums moving forwardly on the paths laterally outwardly toward the unloading stations.

A novel side wall construction is disclosed, wherein portions of the side walls are laterally outwardly displaced at particular locations so that the side walls can be positioned close to the drums and the overall width of the vehicle body minimized. The laterally outwardly displaced portions of the side walls also serve to increase their strength.

A novel method of loading and unloading the drums from the vehicle body is also disclosed, whereby the driver of the vehicle does not have to get into the vehicle body during a loading or unloading operation.

4 Claims, 10 Drawing Figures

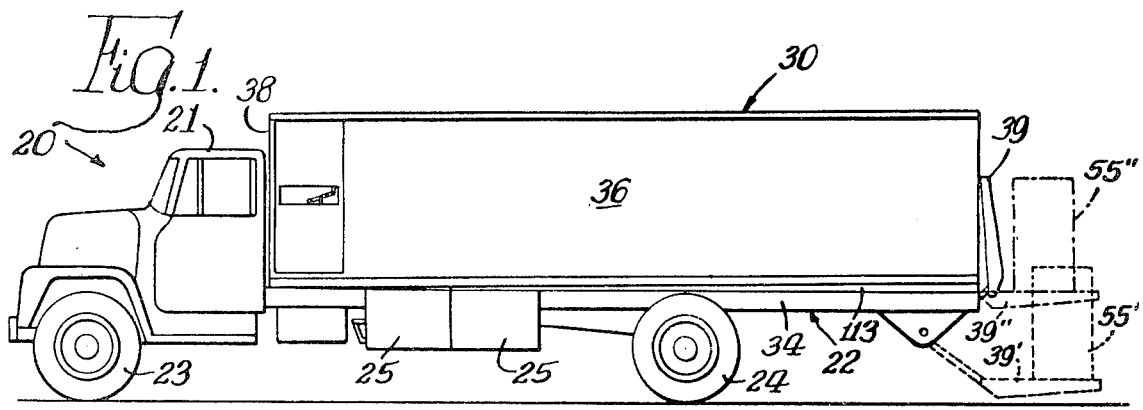
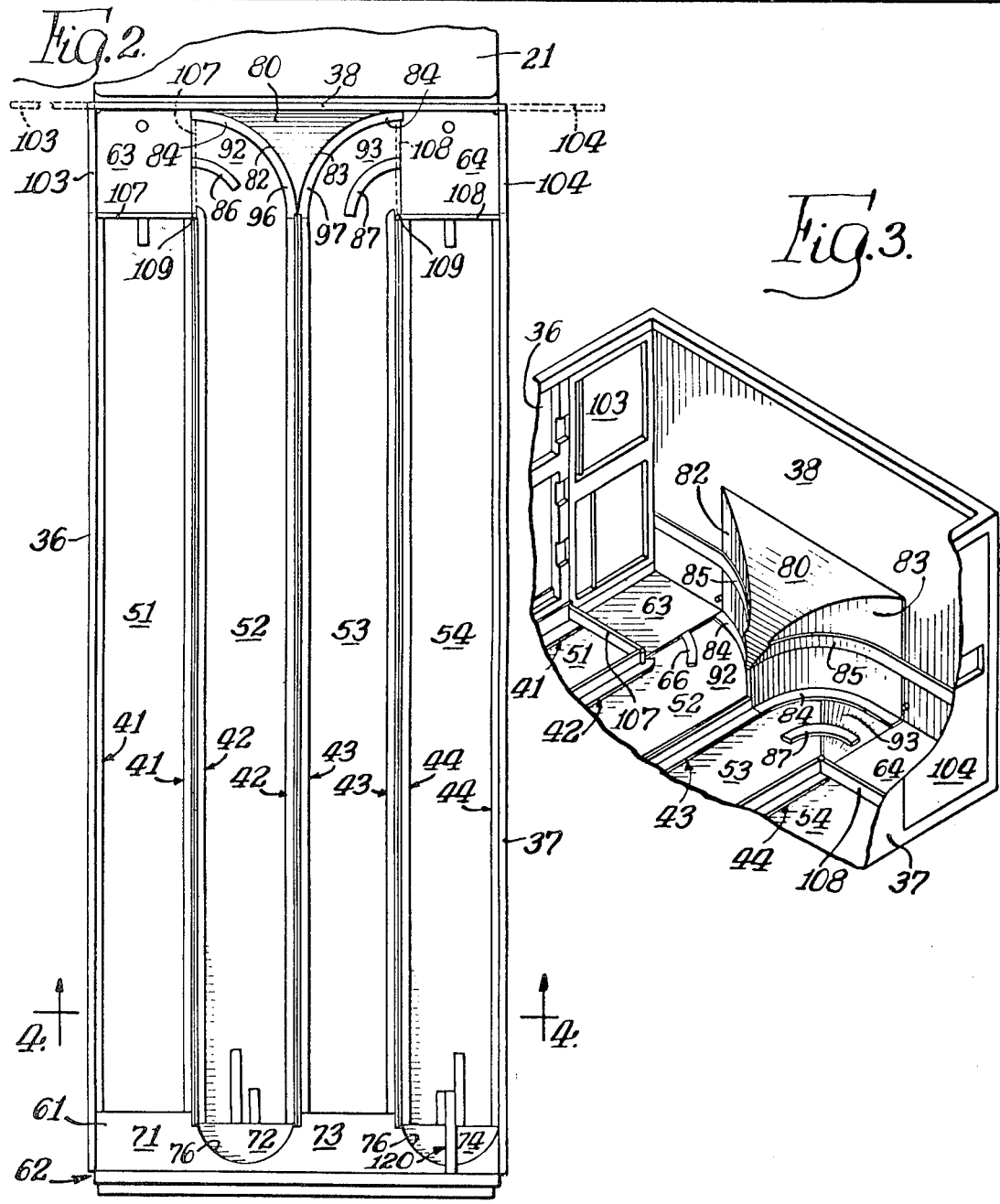

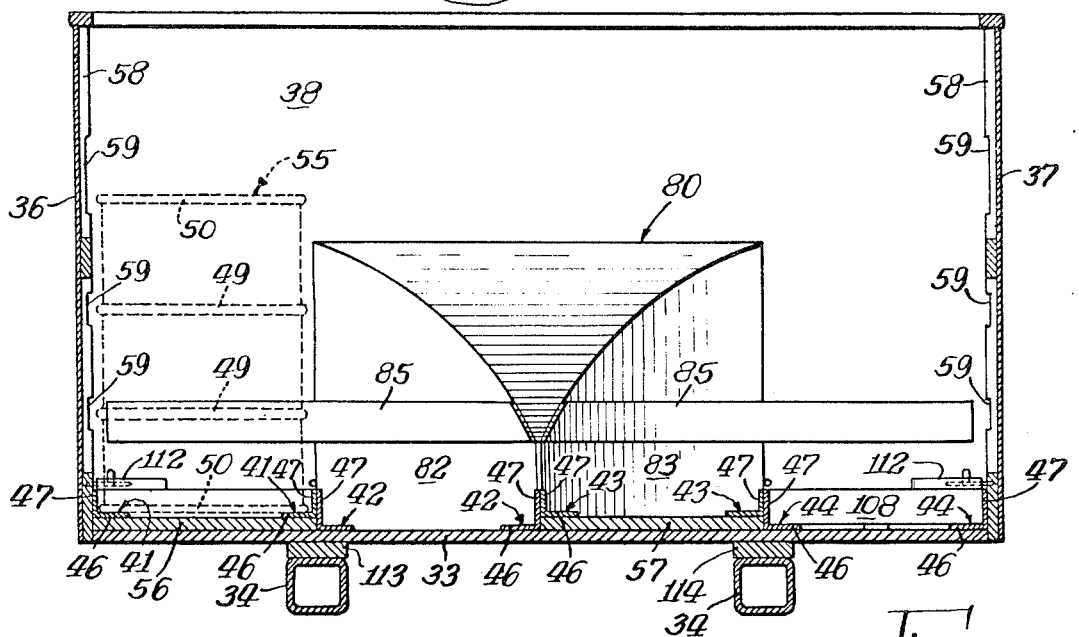
Fig. 4.
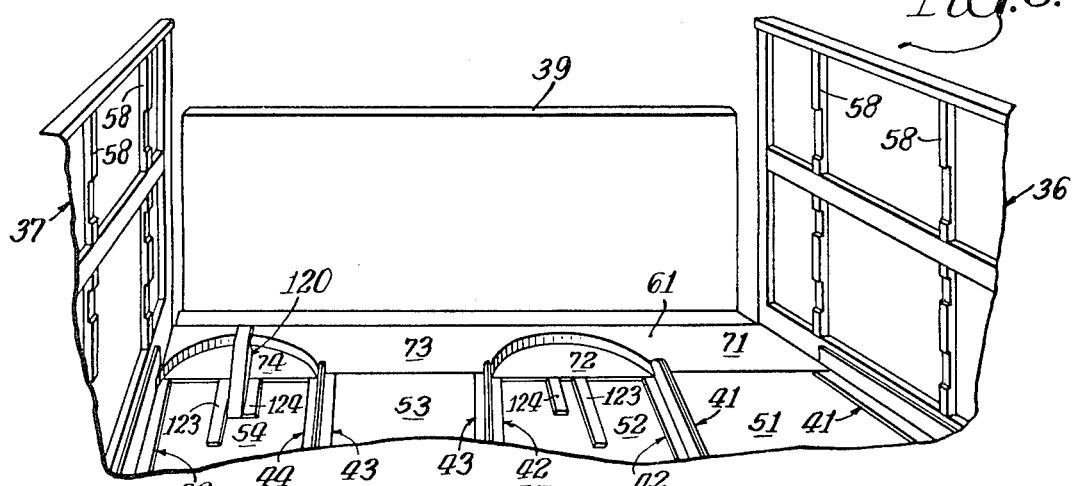
Fig. 5.
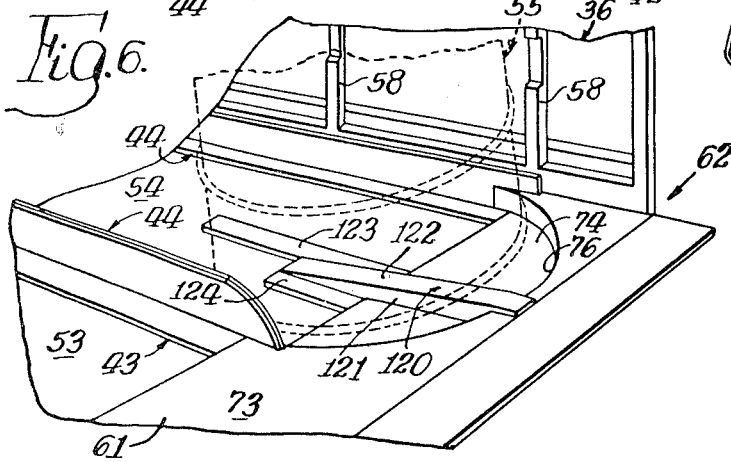
Fig. 6.
Fig. 7.

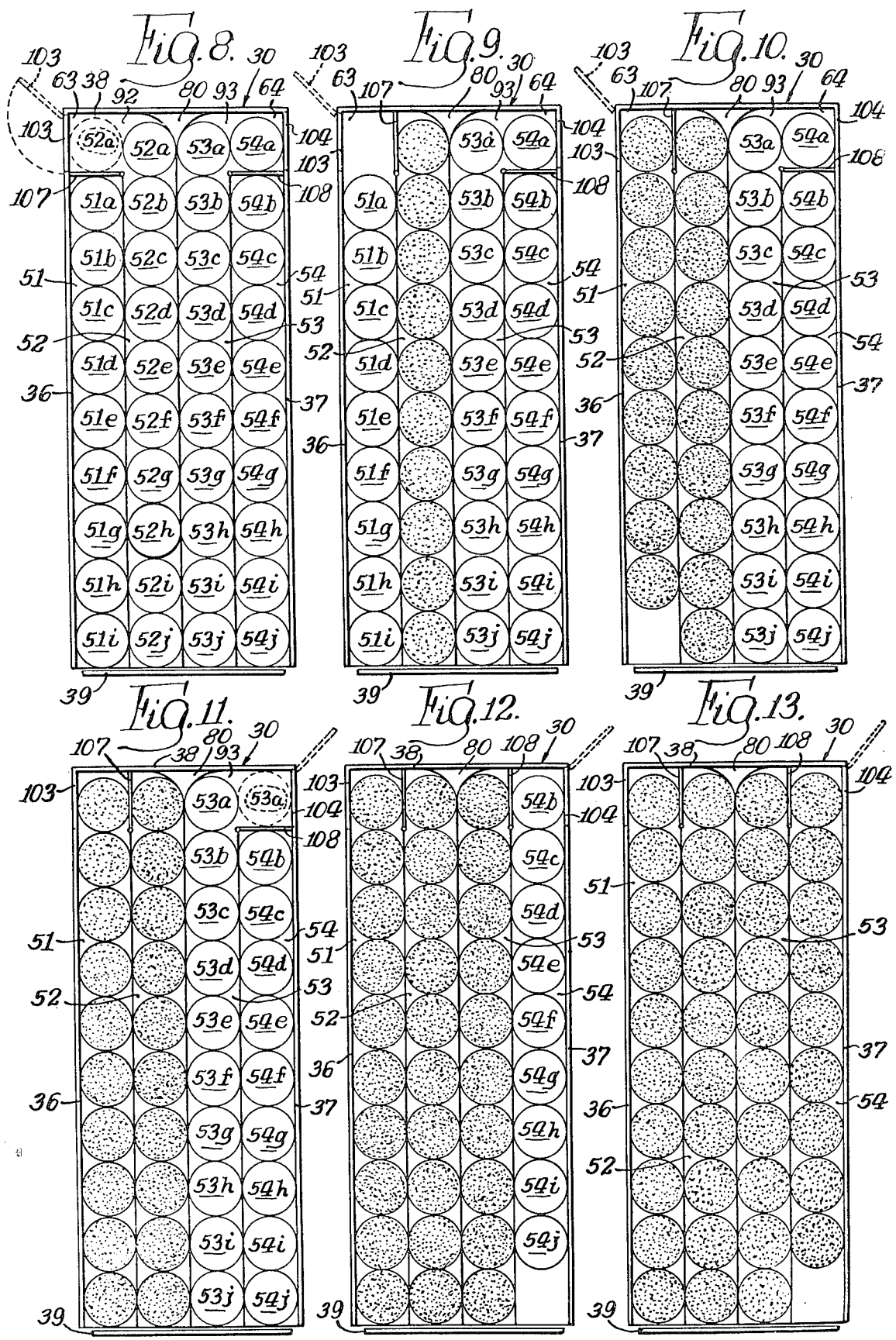

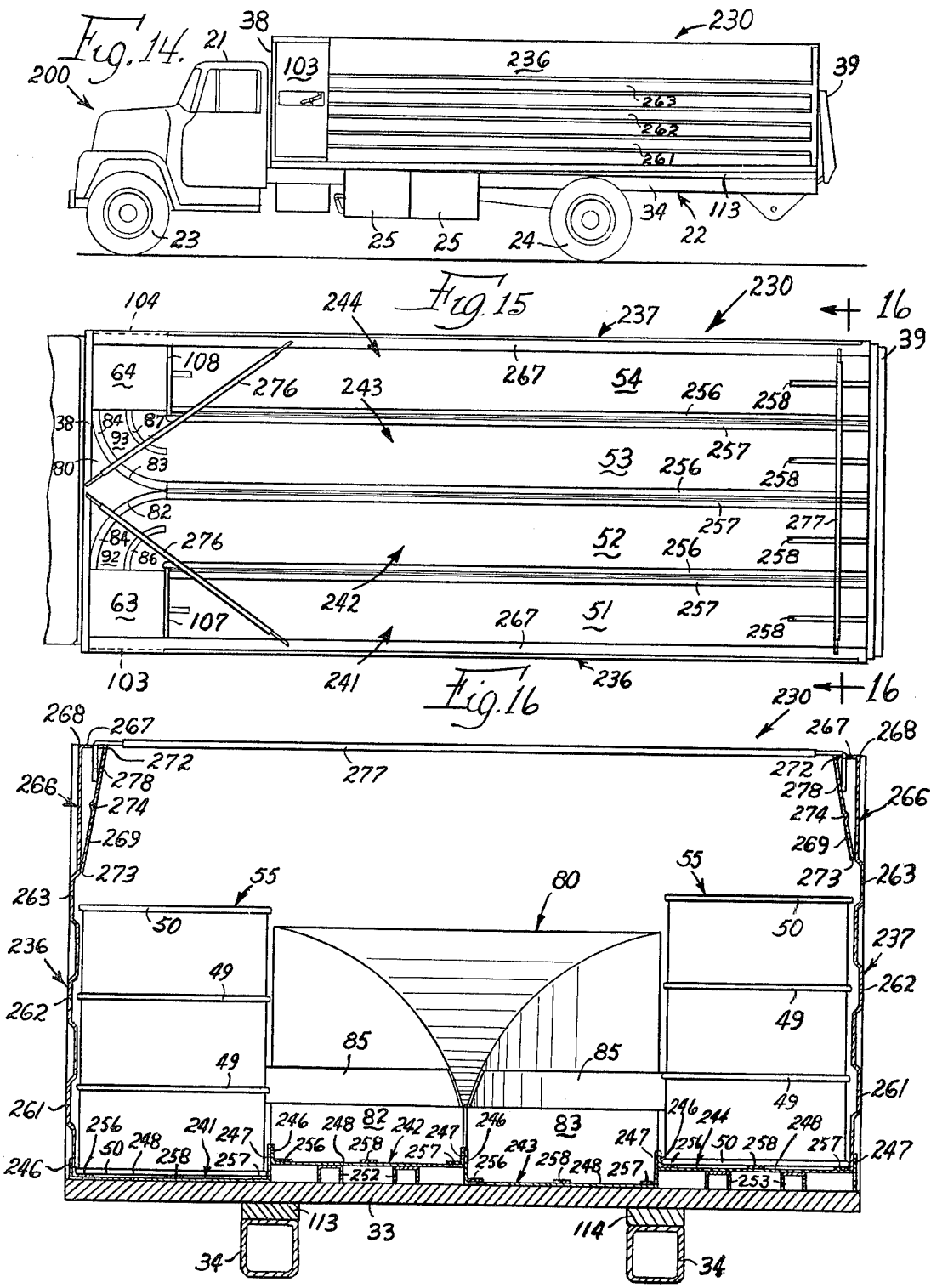

SIDE WALL CONSTRUCTION FOR A CARGO TRANSPORTING AND HANDLING VEHICLE

This is a division of application Ser. No. 302,477, filed Oct. 30, 1972, now U.S. Pat. NO. 3,833,139, which is a continuation-in-part of application Ser. No. 132,319, filed Apr. 8, 1971 and now abandoned.

This invention relates to cargo transporting and handling vehicles, and more particularly to a cargo transporting vehicle having a novel body construction which facilitates the loading of cargo elements onto and off of the body with a minimum of effort on the part of the driver.

Various constructions have been heretofore advanced to facilitate the loading and unloading of cargo from a transporting vehicle. Where specialized or standard sized items of cargo were transported, specialized constructions were developed to facilitate the handling of such cargo. Examples of some of the specialized constructions employed in vehicles for transporting specialized items of cargo, such as large cans of liquid, are disclosed in the Matthews U.S. Pat. No. 125,592 and the Marx U.S. Pat. No. 525,106. With the development of improved bottling techniques, various specialized constructions have evolved which facilitate the loading and unloading of bottled liquids, such as milk and soft drinks. Such constructions permit a driver to rapidly cover a route along which individual containers or case lots of bottled milk or soft drinks are dropped off and empties are picked up. Examples of constructions of the latter type are disclosed in the Wann U.S. Pat. No. 1,601,990, Richards U.S. Pat. No. 2,459,839, Sanger et al. U.S. Pat. No. 2,556,399, Hummel U.S. Pat. No. 2,399,794 and Kramer U.S. Pat. No. 3,501,195.

The more recently developed containerized method of cargo transportation has resulted in the development of many new types of vehicle constructions designed specifically to handle containers of a uniform size and shape. An example of the latter type of vehicle, and the apparatus associated therewith to facilitate loading, transportation, and unloading of a particular size container, is disclosed in the Achammer U.S. Pat. No. 3,228,542.

While many of the aforementioned constructions employed in cargo transporting vehicles have proved generally satisfactory for their intended purpose, others have not for various reasons. One of such reasons is that excessive amounts of time had to be spent by the driver of the vehicle at each stop in climbing into or onto the cargo carrying portion thereof to unload or load items of cargo. Another reason is the high cost of such constructions, which oftentimes involved elaborate auxiliary equipment. This is particularly true with vehicles designed to transport containerized cargo. A further reason is the unreliability of such constructions due to their inability to withstand rough useage.

Accordingly, it is a general object of the invention to provide a novel and improved cargo transporting and handling vehicle, which overcomes the aforementioned disadvantages of the prior art.

Another object is to provide a novel cargo transporting and handling vehicle, which permits cargo to be rapidly and easily loaded onto or off of the vehicle.

A further object is to provide a novel cargo transporting and handling vehicle of the foregoing character, which does not require the driver to enter the cargo carrying portion of the vehicle in order to load or unload cargo therefrom.

A more particular object is to provide a novel cargo transporting and handling vehicle of the character described, that is particularly adapted to facilitate the loading and unloading of standard size, 55 gallon drum containers.

A specific object is to provide a novel cargo transporting and handling vehicle, wherein guide paths are provided on the floor of the vehicle to guide the direction of movement of unrestrained cargo carried by the vehicle and wherein a downward slant of the floor of the vehicle toward the front end thereof is utilized to cause cargo on the guide paths to shift toward an unloading station at the front of the vehicle as it starts and stops along a route.

A further object is to provide a novel cargo transporting and handling vehicle having a side wall construction which will accommodate laterally outwardly protruding structure on cargo elements being transported by the vehicle so that the side walls can be positioned close to the cargo elements without contacting the same and which has improved strength characteristics.

Other objects and advantages of the invention will become apparent from the following detailed description and accompanying sheets of drawings in which:

FIG. 1 is a side elevational view of a cargo transporting and handling vehicle embodying the features of the present invention;

FIG. 2 is a somewhat enlarged, top plan view of the cargo carrying or body portion of the vehicle shown in FIG. 1;

FIG. 3 is a fragmentary, perspective view, with portions thereof broken away, of the front end of the cargo carrying portion of the vehicle shown in FIG. 1;

FIG. 4 is an enlarged, transverse sectional view taken along the line 4—4 of FIG. 2;

FIG. 5 is a fragmentary perspective view of the rear portion of the vehicle body and showing additional structural details thereof;

FIG. 6 is a fragmentary perspective view of a portion of the rear end of the vehicle illustrated in FIGS. 1 and 2, and showing an auxiliary ramp structure in the position it occupies when cargo is being unloaded from the vehicle;

FIG. 7 is a perspective view of the auxiliary ramp structure shown in FIGS. 5 and 6;

FIGS. 8–13, inclusive, are a series of semi-diagrammatic plan views, on a reduced scale, of the cargo supporting portion of the vehicle of FIG. 1, and showing the manner in which empty cargo elements are replaced with filled elements as the driver proceeds along a pick-up and drop-off route;

FIG. 14 is a side elevational view of another cargo transporting and handling vehicle embodying the features of the present invention;

FIG. 15 is a somewhat enlarged, top plan view of the cargo carrying or body portion of the vehicle shown in FIG. 14; and FIG. 16 is an enlarged, transverse secional view taken along the line 16—16 of FIG. 15.

Briefly described, the present invention contemplates a novel cargo transporting and handling vehicle which facilitates the loading and unloading of cargo elements off of and onto the vehicle along a drop-off and pick-up route. While the cargo elements will be hereinafter described as standard size 55 gallon drums, cargo elements of different size and configuration could also be employed with appropriate modifications to the vehicle.

For guiding movement of the cargo elements in the body, which are free to shift therein, at least one and preferably four longitudinally extending paths are provided. Such paths are preferably defined by securing a plurality of elongated members to the cargo carrying surface thereof, in the present instance, the floor of the vehicle body, so that the members extend lengthwise thereof and in transversely spaced relation.

A loading station is provided at one end of the body, such as the rear end, and at least one unloading station is provided at the opposite end of the vehicle body, such as the front end. Thus, as the vehicle proceeds along its route, cargo elements initially loaded onto the vehicle may be removed therefrom at the unloading stations and cargo elements picked up along the route may be loaded onto the vehicle at the loading station at the rear end thereof. In the preferred construction to be hereinafter described in detail, two unloading stations are provided at the front end of the vehicle body, which are accessible through side doors adjacent the front end. Such unloading stations are contiguous with the laterally outer paths in the body and receive cargo elements moving forwardly in the body on the guide paths. Access to the unloading stations is provided through doors in the sides of the vehicle body at the front end thereof.

Movement of cargo elements in the vehicle body along the paths toward the unloading stations is achieved by cargo moving means. Such cargo moving means preferably comprises a downward slant of the cargo guiding paths from the rear toward the front end of the body, or from the loading station toward the unloading station. The slant is achieved by shim means in the form of a pair of tapered stringers or planks interposed between the vehicle chassis and the underside of the floor of the vehicle body.

Movement of cargo elements onto the unloading stations from the inner two paths is facilitated by diverting means in the form of a generally triangularly-shaped abutment mounted on the inner side of the front end wall or bulk head of the vehicle body at the center of the inner two paths. Stop means in the form of swingable gates are provided at the forward ends of each pair of paths to control movement of cargo elements onto the unloading stations.

In order to reduce the possibility of contact between the cargo elements as they move along the respective paths, the height of the elongated members which define the paths are preferably alternatively vertically staggered to provide clearance for the usual protruding circumferential ribs and beads on the drums. In addition, portions of the side walls of the vehicle body are laterally outwardly displaced in the vicinity of the ribs and beads on the drums when the latter are positioned on the paths. Such outwardly displaced portions permit the side walls to be positioned close to the cargo elements on the two outer paths so that the overall width of the vehicle body can be minimized. The outwardly displace portions, which are formed by convolutions in the side walls, also serve to strengthen the side walls. Since the paths are vertically staggered, an auxiliary ramp member is provided to facilitate shifting of the cargo elements off of the loading station from the alternate lower paths when the vehicle has completed its route and is to be unloaded.

DESCRIPTION OF THE CONSTRUCTION OF THE VEHICLE SHOWN IN FIGS. 1–7 OF THE DRAWINGS

In FIG. 1, a cargo transporting and handling vehicle or truck 20 embodying the features of the present invention is illustrated. The truck 20, in the present instance, is conventional to the extent that it includes a cab 21 mounted on the front of the vehicle chassis, indicated generally at 22. Front and rear wheels 23 and 24, respectively, support the vehicle for movement over the ground. Auxiliary storage compartments 25 may be secured to the chassis 22, if desired.

Referring now to FIGS. 2, 3 and 4 in conjunction with FIG. 1, the vehicle includes a body 30 mounted on the chassis 22 behind the cab 21. The body 30 defines a cargo receiving compartment which includes an elongated, rectangular load supporting surface or floor 33 (FIG. 4) which may be covered by sheet metal (not shown) and secured to the frame members, indicated at 34, of the chassis 22. The floor 33 is preferably arranged with its longer length extending lengthwise of the chassis. In the specific application of the invention to be hereinafter described, the floor 33 is preferably 20 feet long and 8 feet wide. The body 30 also includes upstanding side walls 36 and 37, and a front wall or bulk head 38. The rear end of the body 30 is open, except when a lift gate 39 secured to the rear end of the chassis 22, is swung to its upwardly extending position illustrated in FIGS. 1 and 5.

In order to guide the direction of movement of cargo elements in the vehicle body 30, which are unrestrained, guide means defining at least one and preferably a plurality of longitudinally extending, juxtaposed paths are provided in the body 30. Such guide means, in the present instance, comprises a plurality of elongated members in the form of angle bars secured to the upper surface of the floor 33 in laterally spaced pairs. In the present instance, four pairs of angle bars are provided, the bars of each pair being respectively indicated at 41–44, inclusive. It will be understood that structures other than angle bars could be utilized to provide paths in the body 30.

As best seen in FIG. 4, the bars of each pair are arranged so that one of the flanges, indicated at 46, of each pair extends horizontally, and the other flange, indicated at 47, of each pair extends vertically upwardly. The vertical flanges 47 are positioned at the laterally outer sides of the bars of each pair. The angle bars are preferably secured to the upper surface of the floor 33, as by welding (not shown). Thus, when secured to the upper surface of the floor 33, the four pairs of angle bars 41–44 define four longitudinally extending paths indicated at 51–54, inclusive, in FIG. 2 on the floor 33 of the vehicle body 30.

In order to minimize the possibility of contact between cargo elements moving on the paths 51–54 and any laterally outwardly projecting structure thereon, means is provided for vertically offsetting alternate ones of the paths 51–54. Thus, when the cargo elements comprise standard size 55 gallon drums, one of which is shown in broken lines and indicated at 55 in FIG. 4, and the drums have the usual radially outwardly extending circumferential ribs and beads therearound, respectively identified at 49 and 50, the paths 51 and 53 are elevated with respect to the paths 52 and 54. In the present instance, such elevation is provided by spacer means in the form of a pair of elongated planks 56 and 57 (FIG. 4) interposed between the undersurfaces of the flanges 46 of the pairs of bars 41 and 43, and the upper surface of the floor 33. The upper surfaces of the planks 56 and 57 are also preferably covered with sheet metal (not shown). Interference between the circumferential ribs 49 and beads 50 on the drums 55 with reinforcing uprights 58 secured to the inner surfaces of the side walls 36 and 37, is minimized by providing notches 59 in the uprights 58 in the vicinity of the ribs 49 and beads 50 when the drums are resting on the paths.

As best seen in FIGS. 2 and 3, the angle bars 41–44 terminate inwardly from the longitudinally forward and rearward ends of the floor 33 so that a loading station 62 is provided at the rear end of the floor 33, and at least one and preferably a pair of unloading stations 63 and 64 are defined at the front end of the floor adjacent the left and right front corners of the vehicle body 30. The loading station 62, in the present instance, comprises a plate 61 secured to the upper surface of the floor 33 so that the upper surface thereof is generally coplanar with those of the paths 51 and 53. The plate 61 thus has two surface portions 71 and 73 coplanar with the upper surfaces of the flanges 46 of the paths 51 and 53. In order to provide two surface portions, indicated at 72 and 74, coplanar with the upper surfaces of the flanges 46 of the paths 52 and 53, the plate 61 is provided with semi-circular cutouts 76, the bottoms of which comprise the surface portions 72 and 74. To this end, the surface portions 72 and 74 are preferably portions of the underlying upper surface of the floor 33 when exposed by the hemispherical cutouts 76 in the plate 61.

It will be understood that the vertical offset of the paths 51 and 53 with respect to the paths 52 and 54 could be eliminated if cargo elements other than 55 gallon drums 55 having the aforementioned circumferential reinforcing ribs and beads therearound were used, or where the size of the cargo elements would permit providing space between the pairs of bars 41–44 which define the paths 51–54. In the event that the aforementioned vertical offset were eliminated between the paths 51 and 53 and 52 and 54, the corresponding vertical offset of the surface portions 71 and 73 and 72 and 74 of the loading station 62 could also be eliminated.

As heretofore mentioned, the vehicle body 30 is provided with at least one and preferably a pair of unloading stations 63 and 64 at the respective front corners of the floor of the body 30. In the present instance, the unloading stations 63 and 64 comprise extensions of the paths 51 and 54 so that cargo elements moving forwardly on the paths 51 and 54 can move directly onto the unloading stations 63 and 64 if the forward ends of the paths 51 and 54 are not blocked.

In order to facilitate movement of cargo elements onto the unloading stations 63 and 64 from the paths 52 and 53, diverting means is provided. Such diverting means, in the present instance, comprises a generally triangularly shaped abutment 80 secured centrally to the inner surface of the front bulkhead 38 with the apex thereof forming a continuation of the vertical flanges 47 of the central angle bars 42 and 43. The abutment 80 has vertically extending side walls 82 and 83 which are preferably arcuate and comprise continuations of the laterally inner boundaries of the paths 52 and 53, respectively. Arcuate strips 84 forming continuations of the horizontal flanges 46 of the central pair of angle bars 42 and 43, are provided at the intersection of the side walls 82 and 83 of the abutment 80, with the floor 33. A length of reinforcing strap stock 85 (FIG. 3) may be secured to the outer surface of the arcuate side walls 82 and 83 and continued along the inner surface of the bulkhead 38, if desired. Thus, the abutment 80 serves to divert cargo elements moving forwardly on the paths 52 and 53 laterally outwardly across transfer zones 92 and 93 at the forward end of the paths 52 and 53. The transfer zones 92 and 93 adjoin the unloading zones 63 and 64 and may be provided with a pair of centrally located, shorter length, arcuate strips 86 and 87 which facilitate movement of cargo elements across the transfer zones 92 and 93 and onto the unloading stations 63 and 64.

Access to the unloading stations 63 and 64 from the exterior of the vehicle body 30 is provided by a pair of doors 103 and 104 in the side walls 36 and 37, thereof, respectively. It will be understood, however, that access to the unloading stations 63 and 64 could be provided by openings at some other location in the body 30, such as in the front bulkhead 38 if space permitted.

In order to control movement of cargo elements onto the unloading stations 63 and 64 from the paths 51 and 52, and 53 and 54, respectively, stop means in the form of a pair of gates 107 and 108 are provided at the forward or discharge ends of the paths 51–54. The gates 107 and 108 are mounted for pivotal movement about vertical axes lying generally in the plane of the vertical flanges 47 of the adjacent angle bars 41,42 and 43,44 of the paths 51,52 and 53,54. Thus, the gates 107 and 108 are swingable between their laterally extending full line and longitudinally extending broken line positions illustrated in FIG. 2. A latch mechanism, indicated generally at 112, in FIG. 4, is provided on each gate 107 and 108 to secure the gates in their respective positions.

As heretofore mentioned, the vehicle 20 is intended for use along a pick-up and drop-off delivery route. To this end, the body 30 includes means for effecting movement of the cargo elements, such as 55 gallon drums, along the paths 51–54 and onto the unloading stations 63 and 64, so that at least one empty drum will be available for unloading from the vehicle at each stop and room will be available at the rear ends of the paths for receiving at least one filled drum picked up at the same stop. Such means comprises shim means in the form of at least one and preferably a pair of elongated vertically tapered stringers or planks 113 and 114 (FIGS. 1 and 4) interposed between the undersurface of the floor 33 and the longitudinal frame members 34 of the vehicle chassis 22. The members 113 and 114 are preferably wooden planks which taper from the rear end of the vehicle body 30 toward the front end thereof so that the floor 33 and consequently the paths 51–54 slant downwardly from the rear end of the body toward the front end thereof. Such downward slant imposes a tendency on the cargo elements to move forwardly in the paths 51–54 due to the inertia forces acting on the drums generated by the stopping and starting of the vehicle. In other words, as the vehicle 20 starts and stops along a delivery route, the slant of the floor 33 and hence of the paths 51–54 causes the cargo elements on the paths to move forwardly toward the front end of the vehicle until restrained by the gates 107 and 108 or the closed side doors 103 and 104. It will be understood however that some auxiliary mechanism could be provided for effecting such forward movement of the cargo elements on the paths 51–54.

OPERATION AND METHOD OF LOADING AND UNLOADING THE VEHICLE SHOWN IN FIGS. 1–7 OF THE DRAWINGS

Referring now to FIGS. 8–13, inclusive, the operation of the vehicle body 30 and the method of loading cargo onto and off of the body during a typical delivery route, will now be described. It will be assumed that at the start of its route a maximum number of cargo elements, such as the drums 55, have been loaded into the vehicle body 30, as shown in FIG. 8, and that the drums are empty. For convenience of description, the drums on the paths 51–54 have been identified with the number of the path and assigned a letter suffix. Thus, the drums of the path 51 are identified as 51a–51i, the drums on the path 52 are identified as 52a–52j, the drums on the path 53 are identified as 53a–53j, and the drums on the path 54 are identified as 54a–54j. When fully loaded at the start of a route, the vehicle body 30 will contain a total of 39 empty drums, there being nine drums on the path 51, and ten drums on each of the paths 52–54. In addition, the gates 107 and 108 will be locked in their full line, transverse position blocking forward movement of drums on the paths 51 and 54.

As the vehicle begins its route, the normal starting and stopping thereof causes the drums on the path 52 to move forwardly. This is primarily due to the downward slant of the floor 33 from the rear end of the body toward the front end thereof. Consequently, the drum 52a shifts from its full line position at the front of path 52 over the transfer zone 92 and onto the unloading zone 63 adjacent the side door 103. Such position of the drum 52a is indicated in broken lines in FIG. 8.

When the driver arrives at his first stop, he opens the side door 103, removes the empty drum 52a from the loading station 63, closes the door 103, and leaves the drum at the stop. He then lowers the lift gate 39 to its broken line position indicated at 39' in FIG. 1, and places a loaded drum (55') picked up at this stop onto the lift gate. The lift gate is then raised to its broken line position indicated at 39'' in FIG. 1, and then filled drum 55' is then shifted downwardly onto the loading station at the rear end of the body and then into the receiving end of the path 52. A space will be available at the rear of the path 52 for the loaded drum since all of the drums on the path 52 will have moved forward one position when the driver reaches his first stop. This sequence is continued as the driver continues along his route until all of the empty drums on the path 52 have been replaced with filled drums. When the last empty drum 52j on the path 52 has moved off the forward or discharge end of the path and has been removed from the unloading station 63, the driver unlatches the gate 107 and swings it to its full position illustrated in FIG. 9. When so positioned, the gate 107 permits the empty drums 51a–51i on the row 51 to move forwardly on the path as the vehicle 30 continues on its route. At the same time, the gate 107 prevents any of the filled drums on the path 52 from moving onto the unloading station 63.

As the driver continues along his route, each of the empty drums 51a–51i will be sequentially dropped off and replaced with filled drums in the manner previously described. After the last empty drum, namely the drum 51i, has been removed from the unloading station 63 and a filled drum added to the rear of the path 51, the relationship of filled to empty drums in the vehicle body 30 will be as shown in FIG. 10. It should be noted that an empty space remains at the rear or receiving end of the path 51.

At the next stop, the driver opens the door 104 at the right side 37 of the vehicle body 30 and removes the empty drum 54a from the unloading station 64. The filled drum picked up at this stop is then loaded into the empty space at the rear of the path 51. Consequently, both of the paths 51 and 52 will be completely filled with filled drums. The driver then continues along his route unloading the drums 53a–53j from the path 53, which progressively move forward out of the discharge ends of the path and onto the unloading station 64. The empty drums 53a–53j are respectively replaced with filled drums added to the rear or receiving end of the path 53, as the vehicle proceeds along its route.

When the last empty drum 53j on the path 53 is removed from the unloading station 64, the gate 108 is swung from its laterally extending position shown in FIG. 11 to its longitudinally extending position shown in FIG. 12. When so positioned, the remaining empty drums 54b–54j are free to move forwardly on the path 54 toward the unloading station 64 for sequential removal therefrom through the door 104. After the last empty drum 54j in the path 54 has been replaced with a filled drum, an empty space will remain at the rear of the path 54. Such condition is illustrated in FIG. 13. At this time, the driver will have completed his route and will then return to the starting depot.

It should be understood that after the empty drums on the path 52 have been replaced with filled drums, the empty drums on the path 53 could be replaced with filled drums before the empty drums on the paths 51 and 54 are replaced. This procedure would insure a more balanced load.

On arriving at the starting depot, the filled drums may be removed from the vehicle body 30 either through the side doors 103 and 104 or from the rear end thereof, or both. Where the drums are removed from the rear end of the body, they are shifted rearwardly on their respective paths 51–54 and thence onto the lift gate 39, from whence they may be either lowered to the ground or slid off of the lift gate onto an unloading dock. Filled drums that are removed from the vehicle body 30 through the side doors 103 and 104 may be transported to the unloading dock by a lift truck.

In order to facilitate movement of filled drums onto the lift gate 39 from the rear ends of the paths 52 and 54, a removable ramp member 120 is provided. The ramp member 120 is placed at the rear end of each of the paths 52 and 54, in the manner illustrated in FIGS. 2, 5 and 6, and is in the form of a channel having its side flanges 121 tapered. When positioned at the end of either of the paths 52 or 54, the upper surface 122 of the ramp member slants downwardly from the level of the surface portions 71 and 73 to the level of the paths 52 and 54. Consequently, filled containers are readily shifted out of the rear ends of the paths 52 and 54 and onto the lift gate 39. A pair of longitudinally extending, laterally spaced guide strips 123 and 124 may be secured to the upper surface of the sheet metal covering of the paths 52 and 54 adjacent the rear ends thereof to locate the ramp member 120 when the latter is in operation.

While the vehicle body 30 has been herein illustrated and described as having four longitudinally extending paths on the floor 33 thereof, more or less than this number of paths could be provided. In addition, while the paths 51–54 have been herein described as being defined by angle bars 41–44 secured to the upper surface of the floor 33, any other suitable structure capable of performing the functions of the angle bars 41–44, could also be used as, for example, rollers. Likewise, other structures capable of performing the function of the diverting abutment 80, could be employed instead. Further, the order of removal of empty drums from the paths 51–54, and the replacement of such drums with filled drums, could be altered, if desired. Moreover, while the method of loading and unloading the vehicle body 30 has been described in conjunction with a route where empty drums are dropped off and filled drums are picked up, the method is equally applicable to a route where filled drums are dropped off and empty drums are picked up.

DESCRIPTION OF THE CONSTRUCTION OF THE VEHICLE SHOWN IN FIGS. 14–16 OF THE DRAWINGS

In FIG. 14, another cargo transporting and handling vehicle or truck 200 embodying the features of the present invention, is illustrated. The truck 200 is similar in construction to the truck 20, and therefore like reference numerals have been used to identify identical parts. The truck 200 thus includes a cab 21 mounted on the front of a chassis, indicated generally at 22. Front and rear wheels 23 and 24, respectively, support the vehicle for movement over the ground, and auxiliary storage compartments 25 may be provided and mounted on the chassis 22, if desired.

Referring now to FIGS. 15 and 16 in conjunction with FIG. 14, it will be seen that the vehicle 200 includes a body 230 mounted on the chassis 22 behind the cab 21. The body 230 defines a cargo receiving compartment which includes an elongated, rectangular load supporting surface or floor 33 (FIG. 16) which is secured to the frame members 34 of the chassis 22. The floor 33 of the body 230 is of the same dimensions as the floor 33 of the body 20, that is, it is about 20 feet long and 8 feet wide. The body 230 includes upstanding side walls 236 and 237, which employ a novel construction to be hereinafter described in detail, and a front-wall or bulkhead 38. The rear end of the body 230 is open, except when a lift gate 39, secured to the rear end of the chassis 22, is in its upwardly extending position illustrated in FIG. 14.

The vehicle body 230, like the body 30, is provided with guide means which define at least one and preferably a plurality of longitudinally extending, juxtaposed paths for guiding the direction of movement of cargo elements in the body. Such guide means, in the present instance, comprises a plurality of elongated members in the form of channel-shaped pans, respectively, indicated at 241–244, inclusive, in FIGS. 15 and 16. As best seen in FIG. 16, each pan includes a pair of upstanding flanges 246 and 247, and a connecting, horizontal web portion 248. The pans 241–244 are secured to the upper surface of the floor 33, and the vertical flanges of the pans are preferably secured to each other, as by welding (not shown) in back-to-back relation. When mounted on the floor 33, the pans 241–244 define four longitudinally extending paths, respectively indicated at 51–54, inclusive, in FIG. 15.

In order to minimize the possibility of contact between cargo elements moving on the paths 51–54 of the body 230 and between laterally outwardly projecting structures thereon, means is provided for vertically offsetting alternate ones of the paths 51–54. Thus, when the cargo elements comprise standard size 55 gallon drums, having the usual radially outwardly extending circumferential ribs 49 and beads 50 therearound, the paths 51 and 53 are elevated with respect to the paths 52 and 54. Two of such drums are shown in FIG. 16 and respectively indicated at 55. In the present instance, the paths 52 and 54 are elevated by providing two pairs of longitudinally extending, inverted channels 252 and 253 between the upper surface of the floor 33 and the undersurface of the web portions 248 of the pans 242 and 244. Since the pans 242 and 244 are elevated with respect to the pans 241 and 243, the flanges 246 and 247 of the pans 242 and 244 are shorter than the corresponding flanges 246 and 247 of the pans 241 and 243.

In order to reduce the wear on the pans 241–244, longitudinally extending metal skids 246 and 247 may be welded or otherwise secured to the upper surface of the web portion 248 of each pan adjacent the flanges 246 and 247. In addition, a short, longitudinally extending metal skid 248 may be centrally mounted on the upper surface of the web portions 248 of each pan, to minimize wear due to the shifting of drums onto loading stations provided by the open ends of the paths 51–54 at the rear of the body 230.

As best seen in FIG. 15, at least one or preferably a pair of unloading stations 63 and 64 are defined at the front end of the body 230 adjacent the left and right front corners thereof. In addition, diverting means in the form of a generally triangularly shaped abutment 80 is secured centrally to the inner surface of the bulkhead 38, and stop means in the form of gates 107 and 108 are provided at the forward or discharge ends of the paths 51–54 to control movement of drums onto the unloading stations 63 and 64 and to permit removal of drums through the side doors 103 and 104. The remaining structure at the front of the vehicle body 230 is identical with that at the front of the body 30 and therefore will not be again described. Accordingly, reference should be made to the description of this portion of the vehicle body 30 for an understanding of the corresponding structure of the vehicle body 230.

The manner in which the drums advance along the paths 51–54 of the vehicle body 230 and the manner in which they are unloaded from the unloading stations 63 and 64 at the front of the body 230 is likewise the same as in the previous embodiment. Reference should therefore be made to the description of the operation and method of loading and unloading the body 30 for an understanding of the operation and method of loading and unloading the body 230.

As heretofore mentioned, the paths 52 and 54 of the body 230 are elevated with respect to the level of the paths 51 and 53 in order to permit closer positioning of the drums on the respective paths without contact between the ribs 49 and beads 50 thereof. In furtherance of this concept and to permit the side walls 236 and 237 to be positioned close to the drums on the outer paths 51 and 54 so that the overall width of the body is minimized, as well as to strengthen the side walls, the side walls 236 and 237 include means for accomplishing these purposes. Such means, in the present instance, comprises at least one and preferably a plurality of laterally outwardly displaced portions of the material of the side walls 236 and 237. Such portions, which are preferably formed by longitudinally extending convolutions in the side walls, are respectively indicated at 261–263 in FIGS. 14 and 16 and are located in the side walls so as to be in substantial vertical alignment with the ribs 49 and upper bead 50 of the drums 55 on the outer paths 51 and 54. It should be noted that since the drums 55 on the path 54 are elevated somewhat above the level of the drums 55 on the path 51, the outwardly displaced portions 261–263 in the side wall 237 are elevated above the outwardly displaced portions 261–263 in the side wall 236 by an amount corresponding to the elevation of the path 54 above the path 51.

The outwardly displaced portions 261–263 of the side walls 236 and 237 thus permit the main body of each side wall to lie closer to the drums on the adjacent paths 51–54 so that the overall width of the body 230 may be minimized. In addition, the portions 261–263 strengthen the side walls and eliminate the need for supplemental internal or external bracing.

In order to strengthen the upper portions of the sidewalls 236 and 237, reinforcing means in the form of an enlarged section 266 (FIG. 16), is provided on the upper portion of each of the side walls. Each enlarged section 266 is defined by a flange 267, which extends laterally inwardly from the upper longitudinal edge, indicated at 268, of each of the side walls 236 and 237, and by an elongated plate 269 (FIG. 16). Each plate 269 has its upper longitudinal edge 272 secured, as by welding, to the inner edge of the flange 267, and its lower longitudinal edge 273 secured, as by welding, to the inner surface of the side wall at a point space below the flange 267. Thus, the enlarged section 266 on each of the side walls 236 and 237 is generally triangular in cross section and thus extremely rigid. A longitudinally extending, concave bead 274 may be formed in each plate 269 for increased rigidity.

While the convolutions 261–263 and reinforcing triangular sections 266 in the side walls 236 and 237 substantially increase the strength and rigidity of the side walls, additional strengthening structure may also be provided. Thus, a pair of diagonally extending bars, each of which is indicated at 276 in FIG. 15, may be secured at one end of the upper edge of the front bulkhead 38, at the approximate center thereof, and the opposite ends of the bars 276 may be secured to the horizontal flanges 267 of the side walls 236 and 237 at locations spaced longitudinally rearwardly from the bulkhead 38. In addition, stabilizing means in the form of another cross bar 277 may be provided for stabilizing the upper ends of the side walls 236 and 237 at the rear end of the body 230. The cross bar 277 is preferably removably connected to the side walls. To this end, the remote ends, indicated at 278, of the cross bar 277 may be bent at a right angle to the main body of the bar so that the ends 278 can be inserted into openings (not shown) in the horizontal flanges 267 of each side wall, in the manner illustrated in FIG. 16.

While only two embodiments of the invention have been herein illustrated and described, it will be understood that modifications and variations thereof may be effected without departing from the scope of the invention as set forth in the appended claims.

I claim:

1. In a cargo transporting and handling vehicle for transporting a plurality of cargo elements having laterally outwardly protruding structure thereon, said vehicle including a vehicle body having an elongated cargo supporting surface and laterally spaced upstanding side walls, and guide means carried by said surface and defining at least two longitudinally extending, side-by-side, parallel paths on said surface, one of said paths being disposed adjacent to one of said side walls and one of said paths being elevated above the other of said paths so that the laterally outwardly protruding structure on cargo elements on one of said paths does not contact the laterally outwardly protruding structure on cargo elements on the other of said paths as the cargo elements are moved along their respective paths, the improvement of means carried at least by said one side wall for accommodating the protruding structure on cargo elements on said one path so that said side wall may be positioned close to cargo elements on said one path and the overall width of said vehicle body minimized, said accommodating means also serving to strengthen said side wall and comprising at least one laterally outwardly displaced, longitudinally extending portion of the material of said one side wall, said displaced portion being located so as to be in substantial vertical alignment with the protruding structure on the cargo elements on said one path and normally being out of contact with said protruding structure.

2. The cargo transporting and handling vehicle of claim 1, in which said guide means defines at least two other side-by-side, parallel paths on said cargo supporting surface between said one path and said other path, alternate ones of said paths be elevated above the other paths so that the laterally outwardly protruding structures on cargo elements on said paths do not contact each other.

3. In a cargo transporting and handling vehicle for transporting a plurality of cargo elements having laterally outwardly protruding structure thereon, said vehicle including a vehicle body having an elongated cargo supporting surface and laterally spaced upstanding side walls having upper, longitudinally extending edges, and guide means carried by said surface and defining at least one longitudinally extending path on said surface adjacent one of said side walls, the improvement of means carried at least by the side wall adjacent to said path for accommodating the protruding structure on said cargo elements so that said side wall may be positioned close to cargo elements on said path and the overall width of said vehicle body minimized, said accommodating means also serving to strengthen said side wall and comprising at least one laterally outwardly displaced portion of the material of said side wall, said displaced portion being located so as to be in substantial vertical alignment with the protruding structure on said cargo elements when said cargo elements are positioned on said path and normally being out of contact with said protruding structure, and said side walls having enlarged sections on the upper portions thereof to further strengthen said side walls, each of said enlarged sections having a laterally inwardly extending flange on the upper edge of said side wall and an elongated plate having one of its longitudinal edges secured to the inner edge of said flange, the other longitudinal edge of said plate being secured to said side wall below said flange, whereby said enlarged section is triangular in cross section.

4. The cargo transporting and handling vehicle of claim 3, in which a longitudinally extending bead is provided in said plate to increase the rigidity thereof.

* * * * *